United States Patent
Smith

(10) Patent No.: US 6,361,458 B1
(45) Date of Patent: *Mar. 26, 2002

(54) HYDRAULIC TENSIONER WITH PRESSURE RELIEF VALVE

(75) Inventor: Franklin R. Smith, Cortland, NY (US)

(73) Assignee: BorgWarner Inc., Troy, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/282,350

(22) Filed: Mar. 31, 1999

Related U.S. Application Data

(60) Provisional application No. 60/082,459, filed on Apr. 20, 1998.

(51) Int. Cl.[7] .............................. F16H 7/08; F16H 7/22
(52) U.S. Cl. ...................................... 474/109; 474/110
(58) Field of Search ................................. 474/101, 109, 474/110, 111, 113, 117, 135, 138, 140, 115

(56) References Cited

U.S. PATENT DOCUMENTS

| | | | |
|---|---|---|---|
| 4,507,103 A | 3/1985 | Mittermeier | 474/110 |
| 4,874,352 A | 10/1989 | Suzuki | 474/110 |
| 4,881,927 A | 11/1989 | Suzuki | 474/110 |
| 5,577,970 A | 11/1996 | Smith et al. | 474/10 |
| 5,700,213 A | 12/1997 | Simpson et al. | 474/110 |
| 5,707,309 A | 1/1998 | Simpson | 474/110 |
| 5,718,650 A | 2/1998 | Smith et al. | 474/110 |
| 5,720,684 A | 2/1998 | Mott | 474/110 |
| 5,842,943 A | * 12/1998 | Tada | 474/110 |
| 5,860,881 A | * 1/1999 | Tada | 474/110 |
| 5,879,256 A | 3/1999 | Tada | 474/110 |
| 5,935,031 A | * 8/1999 | Tada | 474/110 |
| 5,993,341 A | * 11/1999 | Anderson | 474/110 |

FOREIGN PATENT DOCUMENTS

| | | |
|---|---|---|
| DE | 3639389 A | 5/1988 |
| DE | 849938 C | 9/1992 |
| EP | 0483564 | 6/1994 |
| GB | 1481280 | 7/1977 |
| JP | 3-012995 | 4/1989 |

OTHER PUBLICATIONS

European Search Report for 99302897.6 dated Jun. 14, 2000.

* cited by examiner

Primary Examiner—Thomas R. Hannon
(74) Attorney, Agent, or Firm—Sidley Austin Brown & Wood; Greg Dziegielewski

(57) ABSTRACT

A hydraulic tensioner having a piston slidably received in a housing bore and biased in a protruding direction by a spring. A pressure relief valve is positioned in the nose of the piston. The pressure relief valve includes a valve member and seat member. The valve member biased by a spring disposed between the seat member and a retaining plate on the valve member.

11 Claims, 3 Drawing Sheets

HYDRAULIC TENSIONER WITH PRESSURE RELIEF VALVE

This application claims the benefit of U.S. Provisional Application Ser. No. 60/082,459, filed Apr. 20, 1998. Reference is made to U.S. Pat. No. 5,577,970, entitled "Hydraulic Tensioner With A Pressure Relief Valve," and U.S. Pat. No. 5,707,309, entitled "Hydraulic Tensioner With Modular Inlet Check Valve With Pressure Relief," both of which are owned by the assignee of the present application and are incorporated herein by reference, which relate to the subject matter of the present invention.

BACKGROUND OF THE INVENTION

A tensioning device, such as a hydraulic tensioner, is used as a control device for a power transmission chain, or similar power transmission device, as the chain travels between a plurality of sprockets. In these devices, the chain transmits power from a driving sprocket to a driven sprocket. One portion of the chain span between the sprockets is tight or under tension while the other portion is slack. Generally, it is important to also impart and maintain a certain degree of tension in the slack portion of the chain to prevent noise, slippage, or the unmeshing of teeth in the case of a toothed chain.

Prevention of such slippage is particularly important in the case of a chain driven camshaft in an internal combustion engine because jumping of teeth will throw off the camshaft timing, possibly causing damage or rendering the engine inoperative. However, in the harsh environment of an internal combustion engine, various factors can cause fluctuations in the chain tension.

Wide variations in temperature and thermal expansion coefficients among the various parts of the engine can cause the chain tension to vary between excessively high or low levels. During prolonged use, wear to the components of the power transmission system can cause a decrease in chain tension. In addition, camshaft and crankshaft induced torsional vibrations may cause considerable variations in chain tensions. Reverse torque on an engine, occurring for example in stopping or in failed attempts at starting, can also cause fluctuations in chain tension. For these reasons, a mechanism is desired to remove excessive tensioning forces on the tight side of the chain and to ensure the necessary tension on the slack side of the chain.

Hydraulic tensioners are a common method of maintaining proper chain tension. In general, these mechanisms employ a lever arm that pushes against the chain on the slack side of the power transmission system. This lever arm must push toward the chain, tightening the chain, when the chain is slack, and must retract away from the chain when the chain tightens.

To accomplish this result, a hydraulic tensioner typically comprises a hollow piston or plunger, which is biased in the direction of the chain by a tensioner spring. The plunger is housed within a cylindrical bore in the tensioner body or housing, which has an interior space which is open at one end. A fluid chamber is formed in the interior space of the bore between the bore and the interior of the hollow piston. The fluid chamber receives fluid through a fluidic connection with a reservoir or exterior source of hydraulic fluid.

Typically, two types of valves are employed to regulate the flow of fluid into and out of the pressure chamber: inlet check valves and pressure relief valves. The inlet check valve typically includes a ball-check valve that opens to permit fluid flow through the valve and into the fluid chamber when the pressure in the chamber has decreased as a result of outward movement of the plunger. When the pressure in the pressure chamber is sufficiently high, the inlet check valve closes, preventing fluid from exiting the pressure chamber, which in turn prevents the piston from retracting, achieving a so-called "no-return" function.

The pressure relief valve performs its function when the pressure in the chamber exceeds a predetermined maximum limit. The pressure relief valve opens to permit fluid to exit the chamber and allow the tensioner to retract in response to large increases in chain tension (and the associated fluid pressure). The pressure relief valve typically includes a spring biased check valve.

In operation, the inward force of the chain on the piston is balanced by the outward force of the tensioner spring and the reaction force from the hydraulic fluid. As the tension in the chain increases, the chain exerts an increased force on the plunger in the direction of plunger retraction. As the plunger is forced in the retraction direction, the fluid pressure in the pressure chamber increases, but the inlet check valve prevents the fluid from exiting the pressure chamber. If the pressure exceeds a predetermined maximum level, the pressure relief valve opens, allowing the fluid to exit the pressure chamber.

Examples of pressure relief valves are shown in the above-mentioned U.S. Pat. No. 5,577,970 and U.S. Pat. No. 5,07,309. In U.S. Pat. No. 5,577,970, the pressure relief valve is in the form of a reed valve that opens to permit fluid to exit the high pressure chamber. In U.S. Pat. No. 5,707,309, the pressure relief valve is integral with the inlet check valve.

SUMMARY OF THE INVENTION

According to one aspect of the present invention, there is provided a tensioner for providing a tensioning force to a power transmission chain that connects at least two rotating members such as a pair of sprockets. A hollow piston slidably fits within a bore in a piston housing, forming a fluid chamber. A spring is positioned within the fluid chamber to bias the piston outward from the bore. An inlet check valve permits flow from a source of pressurized fluid, or a reservoir, into the fluid chamber and prevents flow out of the chamber in the reverse direction.

A pressure relief valve is located in the nose of the piston. This valve permits fluid to exit the high pressure fluid chamber when the pressure in the pressure chamber reaches (or exceeds) a certain specified limit. The valve member includes a stem and rounded portion that closes against a seat member. A valve spring positioned between the seat and a retainer member biases the valve member into a closed position against the seat member. At a predetermined maximum pressure value, the resisting force of the valve spring is exceeded and the spring compresses to permit the valve member to move from the seat member. The seat member is either fixed or biased against the nose of the piston by a piston spring.

For a better understanding of these and other aspects and objects of the invention, reference should be made to the following detailed description taken in conjunction with the accompanying drawings.

BRIEF DESCRIPTION OF THE DRAWINGS

In the drawings, which are not to scale.

DETAILED DESCRIPTION OF THE PREFERRED EMBODIMENTS

Turning now to the drawings, the present invention is directed to providing a pressure relief valve for a hydraulic tensioner. The pressure relief valve is located in the nose or upper portion of the piston of the tensioner.

Figure 1:
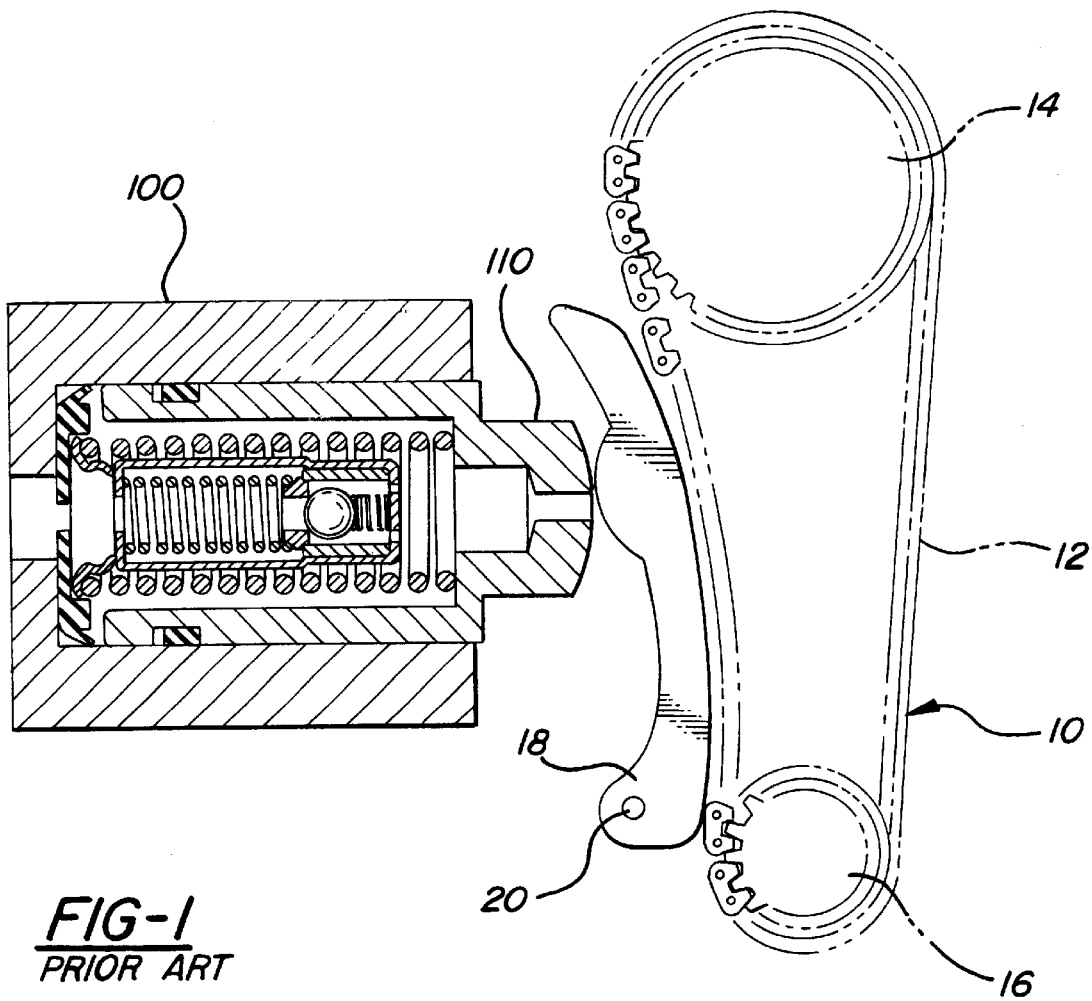
FIG. 1 is a side view of a tensioner of the prior art with a inlet check valve and pressure relief valve with the tensioner maintaining the tension in a power transmission chain.
Figure 2:
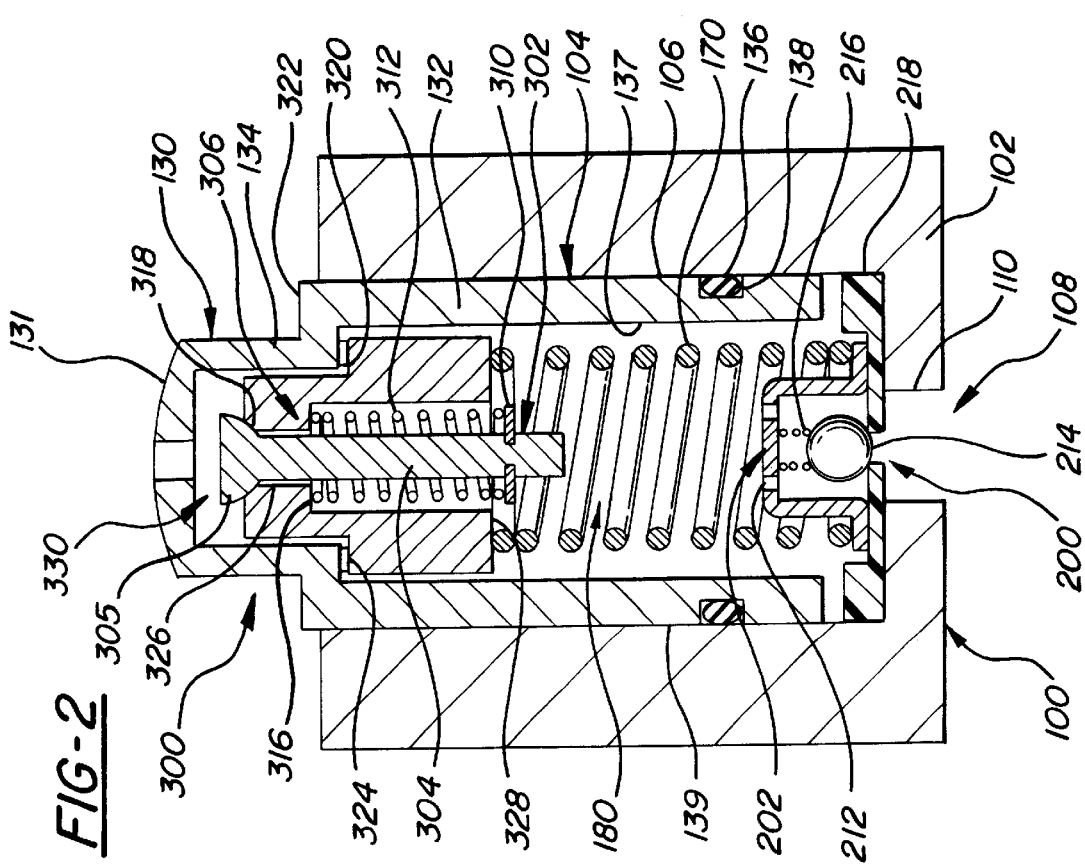
FIG. 2 is a side cross-sectional view of one embodiment of the tensioner of the present invention with the pressure relief valve in the nose of the piston.

FIG. 1 illustrates a hydraulic tensioner with an inlet check valve and a pressure relief valve of the prior art. A power transmission chain system 10 comprises a chain 12 operating between two sprockets 14, 16. A tensioner arm 18, or chain guide, mounted on a pivot 20 presses against the chain to maintain tension. A hydraulic tensioner 100 has a piston 110, which applies force to the lever arm 18. The inlet check valve and pressure relief valve of this tensioner are described in U.S. Pat. No. 5,707,309. The tensioner 100 in FIG. 1 is not to scale in order to illustrate the inlet check valve and pressure relief valve FIG. 2 is a side view of the cross-section of a tensioner with one of the embodiments of the pressure relief valve of the present invention. The tensioner 100 includes a housing 102 having a cylindrical bore 104 and an inner circumferential surface 106 of this bore. The housing has an aperture 108 at the closed end 110 of the bore. This aperture connects to a reservoir or an external supply of pressurized fluid (not shown).

A cylindrical hollow piston 130 is slidably assembled within the bore 104. This piston comprises a cylindrical body 132 with a closed upper end or nose 134. In some embodiments, a seal ring 136 is housed in a groove 138 on the outer circumferential surface 139 of the piston. This seal ring 136 forms a partial seal or flow restriction between the outer circumferential surface 139 of the piston and the inner circumferential surface 106 of the bore 104.

Assembled concentrically within the piston 130 is the piston spring 170. The piston spring 170 biases the piston 130 toward the outside of the housing 102 so that the piston tip 131 at the upper end of the piston nose 134 pushes against the lever arm 18 and associated chain as shown is FIG. 1.

Assembled concentrically or radially within the piston spring 170 is the inlet check valve 200. The check valve has a generally cylindrical housing 202, with a closed end and an open end. The closed end includes fluid openings 212 for the passage of fluid. In its preferred embodiment, the check valve comprises a conventional ball check valve with a valve housing 202 and a ball 214 with a valve spring 216 that moves the ball 214 away from the housing 202. The ball check valve permits flow through the valve into a fluid chamber 180 formed inside the piston 130, when the ball 214 is moved from the valve seat 218 by a pressure differential across the valve. The ball check valve prevents fluid flow through the check valve in the reverse direction as the ball seats against the valve seat 218.

A high pressure fluid chamber 180 is formed within the interior of the hollow piston and the bore. The high pressure fluid chamber 180 is annular in shape. Its outer circumferential surface is formed by the inner circumferential surface 137 of the piston and the inner circumferential surface 106 of the piston housing bore 104. The seal ring 136 minimizes fluid that escapes the high pressure fluid chamber through the space between the piston 130 and the piston housing 102.

As shown more clearly in FIG. 2, a pressure relief valve 300 is located in the nose 134 of the piston 130, which permits fluid to exit the high pressure fluid chamber, but only to provide pressure relief when the pressure of the fluid reaches a certain specified maximum level. The valve 300 includes a valve member 302 that is formed of a valve stem 304 and a rounded or tapered end 305 that is held against a valve seat member 306. A spring retainer washer or retainer member 310 is assembled within the valve stem 304 such that its axial position with respect to the valve member 102 is fixed. A pressure relief spring 312 is mounted on the spring retainer washer 310 and surrounds or is concentric with the valve stem 304.

The annular pressure relief disc member or valve seat 306 is positioned concentrically within the piston body and radially outward from the valve stem 304. One end of the pressure relief spring 312 is biased against an internal base 316 of the valve seat while the opposite end of the spring 312 is biased against the retainer washer 310. In this way, the pressure relief spring 312, braced against the fixed spring retainer washer 310, biases the valve member 302 in the direction of the tapered end 318 of the valve seat 306. When pressure in the pressure fluid chamber exceeds a predetermined maximum level, the tapered end 305 of the valve member 302 moves away from the tapered end 318 of the valve seat to release fluid and relieve pressure in the high pressure fluid chamber.

Biased toward the valve seat, the pressure relief valve member 302 seats against the tapered end 318 of the valve seat 306. The pressure relief valve seat 306 is a formed member that fits within the nose 134 of the piston body. A stepped outer surface 320 abuts an internal step 322 in the piston body. A gasket 324 can be placed therebetween to limit, minimize or eliminate flow of fluid between the seat and the piston body at that area. Alternatively, a limited clearance between the surface 320 and the step 322 of the piston body can permit limited fluid flow and also serve as a vent mechanism for air flow.

The pressure relief valve seat member 306 may be held against the piston body by the piston spring 310 or may be press fit and fixedly mounted in the upper end of the nose of the piston. While a presently preferred structure has been shown, the pressure relief valve seat may be any component fixed with respect to the piston body and capable of forming a seal with the pressure relief valve member.

Flow through the pressure relief valve may be regulated by a number of adjustable mechanisms or fluid flow passages. The spring constant of the pressure relief spring 312 provides one such adjustment mechanism. Similarly, the surface area of the tapered contact portion 318 between the cupped portion of the valve member 305 and the seat 306 is another such adjustment mechanism. Additionally, the clearance between the stem 304 of the valve member and the inner surface 326 of the center aperture in the seat 306 also provides an adjustment mechanism. The distance that the valve retainer washer or member 310 can travel in the axial direction until it abuts the bottom surface 328 of the seat 306 also limits the opening of the pressure relief valve member.

A small fluid reservoir 330 is also created at the top of the valve member within the nose of the piston. This small reservoir acts to prevent ingestion of air into the tensioner during back-flow conditions as the valve is closing against the seat.

Figure 3:
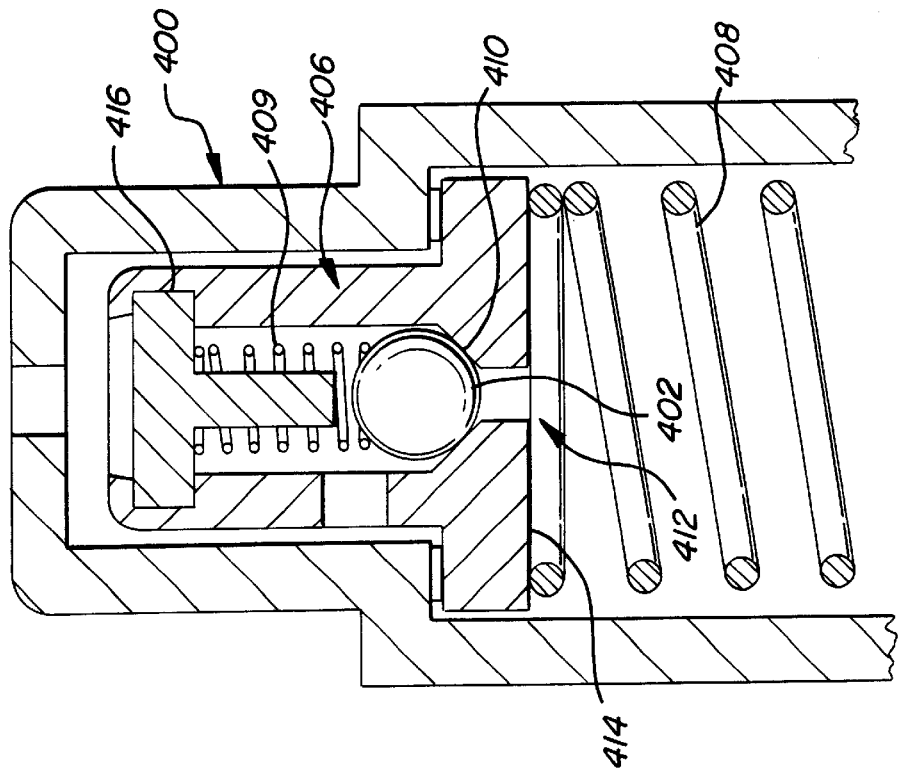
FIG. 3 is a side cross-sectional view of another embodiment of the pressure relief valve of the present invention.

An alternate construction of the pressure relief valve is shown in FIG. 3. Only the upper portion of the piston 400 is shown in this Figure. In this embodiment, the axially moveable valve member is in the form of a spring biased ball 402. The pressure relief valve seat member 406 may be press fit or held in the piston by the piston spring 408. The ball 402 is biased by a spring 409 against a tapered surface 410 adjacent an opening 412 in the base 414 of the seat member. At a predetermined maximum pressure, the ball 402 moves off of the tapered surface 410 of the seat to permit pressure relief by permitting fluid to exit through the opening 412 in the valve.

Preferably, the valve member is a ball, but it may have various geometric configurations. For example, the valve member may be a tapered disc or a tapered plug (not shown). The exact configuration will, of course, depend on the dynamic response desired. For example, a solid ball will have a greater mass and thus a slower response time and a lower natural frequency compared to a small light-weight disc, or even a hollow metal ball. The valve member may also be constructed of ceramic or engineered plastics, such as polymide.

The pressure relief valve spring 409 is biased against a plug member 416, shown as being formed of powder metal material in FIG. 3. The plug member 416 is inserted into the valve seat 406 after insertion of the ball 402 during assembly of the valve.

Figure 4:
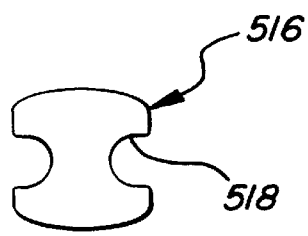
FIG. 4 is a top view of an alternate embodiment of the plug member.

An alternate construction of the plug member 516 is shown in FIG. 4. The plug member 516 includes slots 518 to permit flow through the center 420 of the seat member 406. Allowing flow through the center of the seat 406 permits a threaded attachment of the seat 406 to the piston 400 along sides 422 and 424.

In operation, as the piston moves away from the bore, and the pressure in the high pressure fluid chamber becomes low enough, the inlet check valve member 200 will unseat. Fluid will then flow into the high pressure fluid chamber 180. Thus, the inlet check valve dictates the pressure required to allow fluid to flow into the high pressure fluid chamber 180 from the external source of pressurized fluid.

The pressure relief function is performed as the pressure relief valve member unseats and moves away from the pressure relief valve seat. Under typical conditions, this valve prevents fluid from exiting the high pressure fluid chamber 180. Hydraulic pressure, applied by the fluid against the outside of the pressure relief valve member, and applied by the fluid against the valve member, urges the pressure relief valve open, as the valve member moves away from the pressure relief seat member. This force is resisted by the pressure relief spring. If the pressure from inside the high pressure fluid chamber becomes too great, and the pressure relief valve member unseats, fluid will then flow from the high pressure fluid chamber, through the aperture in the base end of the valve seat, through the space between the outside diameter of the valve member and the inside diameter of the seat, and to atmosphere.

Figure 5:
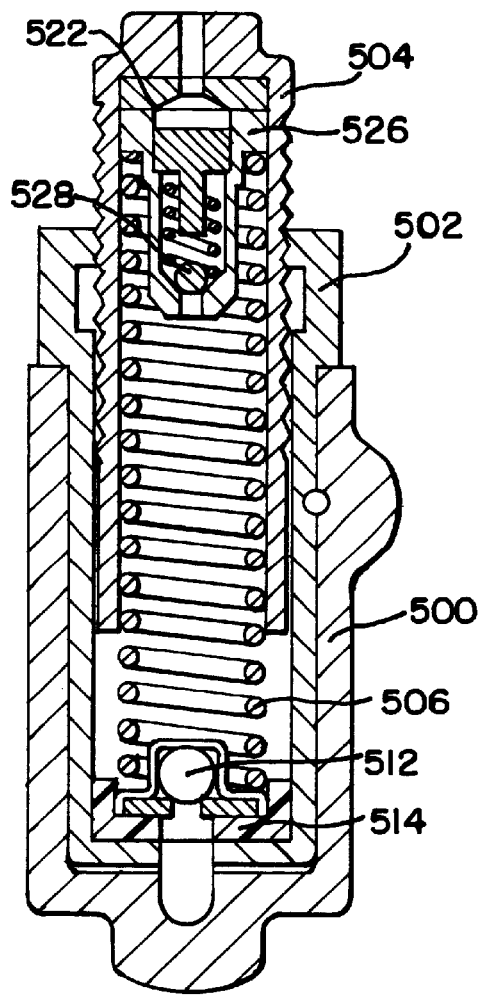
FIG. 5 is a side cross-sectional view another embodiment of the tensioner and pressure relief valve of the present invention.

FIG. 5 illustrates another embodiment in which the tensioner housing 500 holds a sleeve 502. The piston 504 slides within the sleeve 502. The piston spring 506 biases the piston in a direction away from the housing 500. An inlet check valve 510, formed in the base of the sleeve, includes a ball 512 and valve seat 514.

The pressure relief valve 520 is held against a seal 522 by piston spring 506. The seal 522 includes a tortuous vent path for escape of air along its upper surface. The pressure relief valve 520 includes a plug member 524 formed of powder metal that is press fit into the valve seat 526. A ball 528 in the base of the valve is held against an opening 530 in the seat by a valve spring 532.

Figure 6:
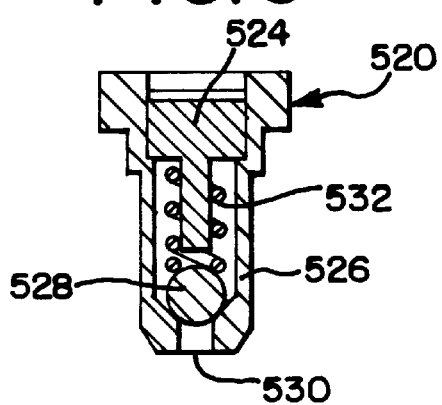
FIG. 6 is a side cross-sectional view of the relief valve seat and plug member.
Figure 7:
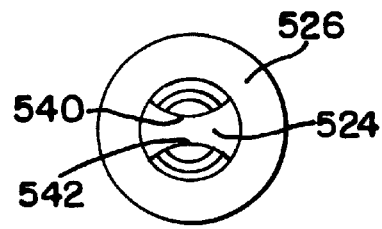
FIG. 7 is a top view of the valve and plug member of FIG. 6.

FIGS. 6 and 7 illustrate the pressured relief valve 520 in more detail. The plug member 524 is press fit in the seat 526. The upper portion of the plug member 524 has recessed sides 540, 542, as shown in FIG. 7, to permit the passage of fluid through the plug member and seat.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:

a housing having a generally cylindrical bore, a hollow piston having an upper end and a lower end, said piston being slidably received within said bore, said lower end of said piston being received in said bore to form a fluid chamber with said bore, a spring positioned within said piston, said spring biasing said piston in an outward axial direction from said bore, a check valve positioned in a fluid passage between said fluid chamber and a source of pressurized fluid to permit fluid flow into the fluid chamber while blocking flow in the reverse direction, a pressure relief valve positioned within said upper end of said piston, said pressure relief valve having a conduit in fluid communication with said fluid chamber to permit passage of fluid from said fluid chamber under specified pressure conditions, said pressure relief valve having a seat member and a valve member, said valve member being translatable within said seat member in said axial direction;

a valve spring biasing said valve member against said valve seat member and in the axial direction toward said fluid chamber, said valve spring being positioned between said valve member and a retention member located within said seat member, said retention member having recessed portions to permit the passage of fluid thereby, said valve member moving away from said seat member to permit fluid flow between said valve member and said seat member and past said retention member when said specified pressure conditions are attained in said fluid chamber.

2. The hydraulic tensioner of claim 1, wherein said retention member includes a stem portion and said seat member includes a tapered end portion, said valve member being seated against said tapered end portion of said seat member.

3. The hydraulic tensioner of claim 2, wherein said valve spring is located radially outward from said retention member stem portion and concentric with said valve seat member in the axial direction.

4. The hydraulic tensioner of claim 3, wherein said valve seat member has a first stepped surface, said piston having an inner stepped surface at said upper end, said first stepped surface being shaped to contact said inner stepped surface of said piston.

5. The hydraulic tensioner of claim 4, wherein a gasket member is interposed between said first stepped surface and said inner stepped surface to limit the passage of fluid therebetween.

6. The hydraulic tensioner of claim 2 wherein a fluid reservoir is formed between said valve member and said piston upper end.

7. The hydraulic tensioner of claim 1 wherein said valve member is a ball.

8. The hydraulic tensioner of claim 7 wherein said valve spring is biased against a plug member located within said seat member.

9. The hydraulic tensioner of claim 8 wherein said plug member has recessed sides to permit the passage of fluid between said plug member and said valve seat member.

10. A hydraulic tensioner comprising:

a housing having a generally cylindrical bore, a hollow piston having an upper end and a lower end, said piston being slidably received within said bore, said lower end of said piston being received in said bore to form a fluid chamber with said bore, a spring positioned within said piston, said spring biasing said piston in an outward axial direction from said bore, a check valve positioned in a fluid passage between said fluid chamber and a source of pressurized fluid to permit fluid flow into the fluid chamber while blocking flow in the reverse direction, a pressure relief valve positioned within said upper end of said piston, said pressure relief valve having a conduit in fluid communication with said fluid chamber to permit passage of fluid from said fluid chamber under specified pressure conditions, said pressure relief valve having a seat member and a valve member, said valve member being translatable within said seat member in said axial direction;

a valve spring biasing said valve member against said valve seat member and in the axial direction toward said fluid chamber, said valve spring being positioned between said seat member and a retention member, said retention member being integral with a stem portion of said valve member, said valve member moving away from said seat member to permit fluid flow between said valve member and said seat member when said specified pressure conditions are attained in said fluid chamber, wherein said valve retention member abuts a bottom surface of said seat member to limit said valve stem portion outer movement in the axial direction.

11. he hydraulic tensioner of claim 10 wherein said seat member and said valve stem portion form a clearance therebetween, said clearance having a predetermined cross-sectional distance.

* * * * *